Figure 1:
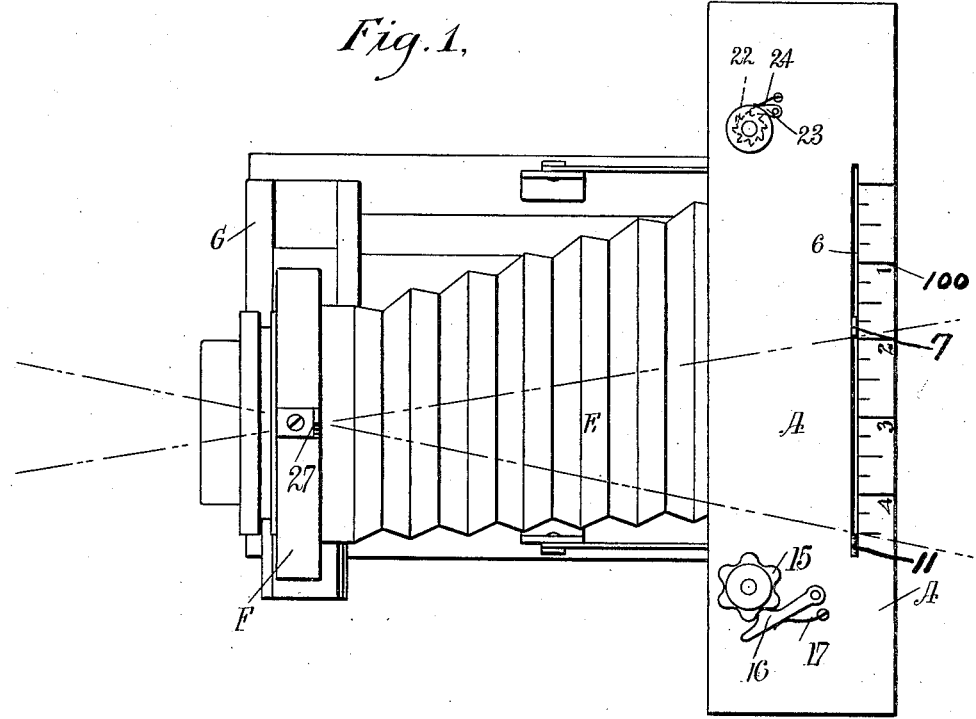

F. M. STEADMAN & H. W. HALES.
FILM CAMERA.
APPLICATION FILED AUG. 31, 1911.

1,032,867.

Patented July 16, 1912.

3 SHEETS—SHEET 1.

WITNESSES
Edward Thorpe,
W. S. Orton.

INVENTORS.
Frank M. Steadman
Henry W. Hales
BY Munn & Co.
ATTORNEYS

F. M. STEADMAN & H. W. HALES.
FILM CAMERA.
APPLICATION FILED AUG. 31, 1911.
1,032,867.
Patented July 16, 1912.
3 SHEETS—SHEET 2.
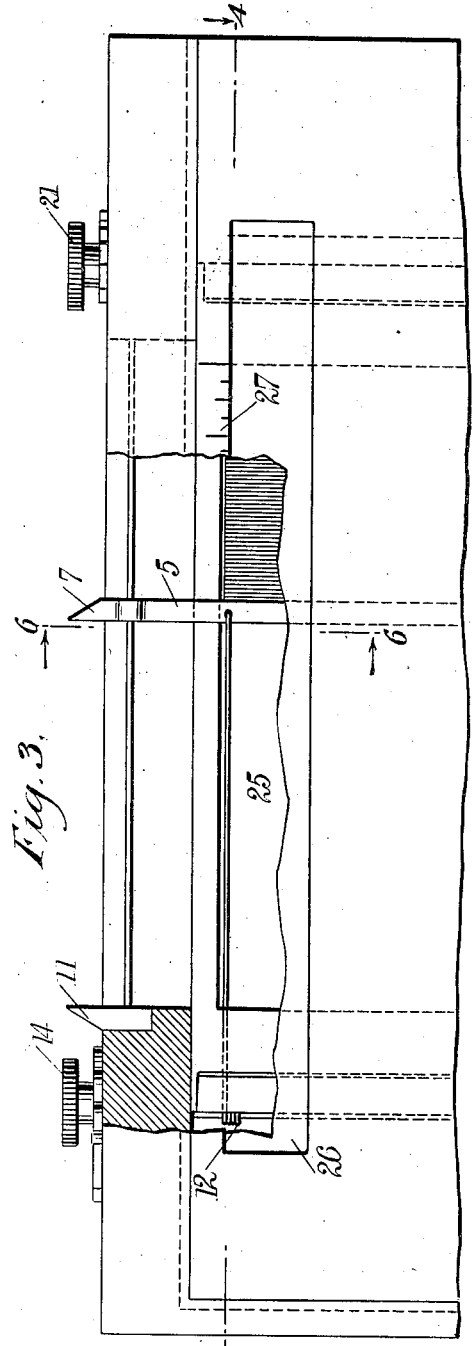
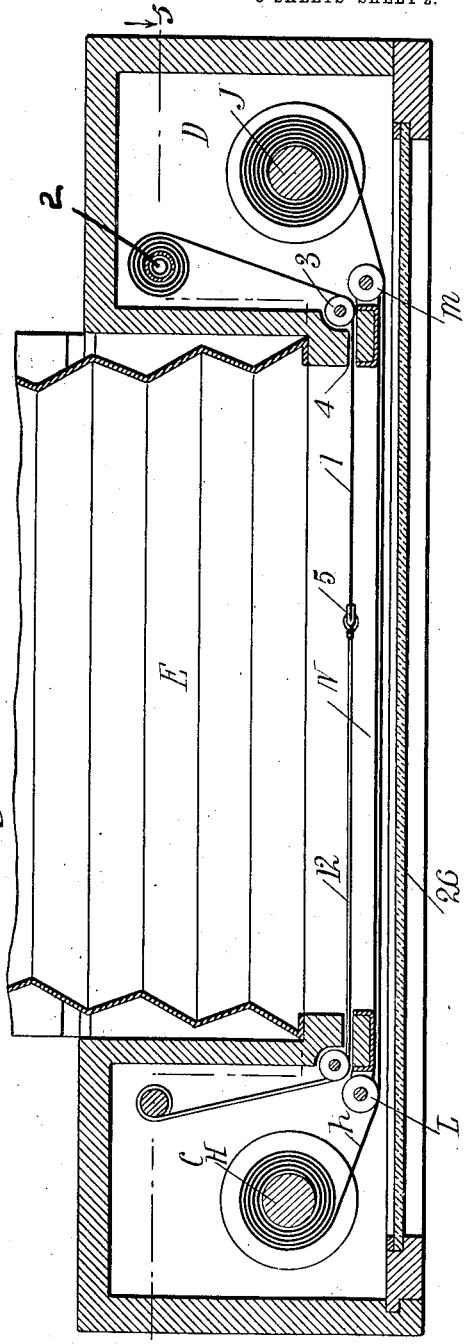
WITNESSES
Edward Thorpe.
W. S. Orton.
INVENTORS.
Frank M. Steadman
Henry W. Hales
BY
Munn & Co.
ATTORNEYS

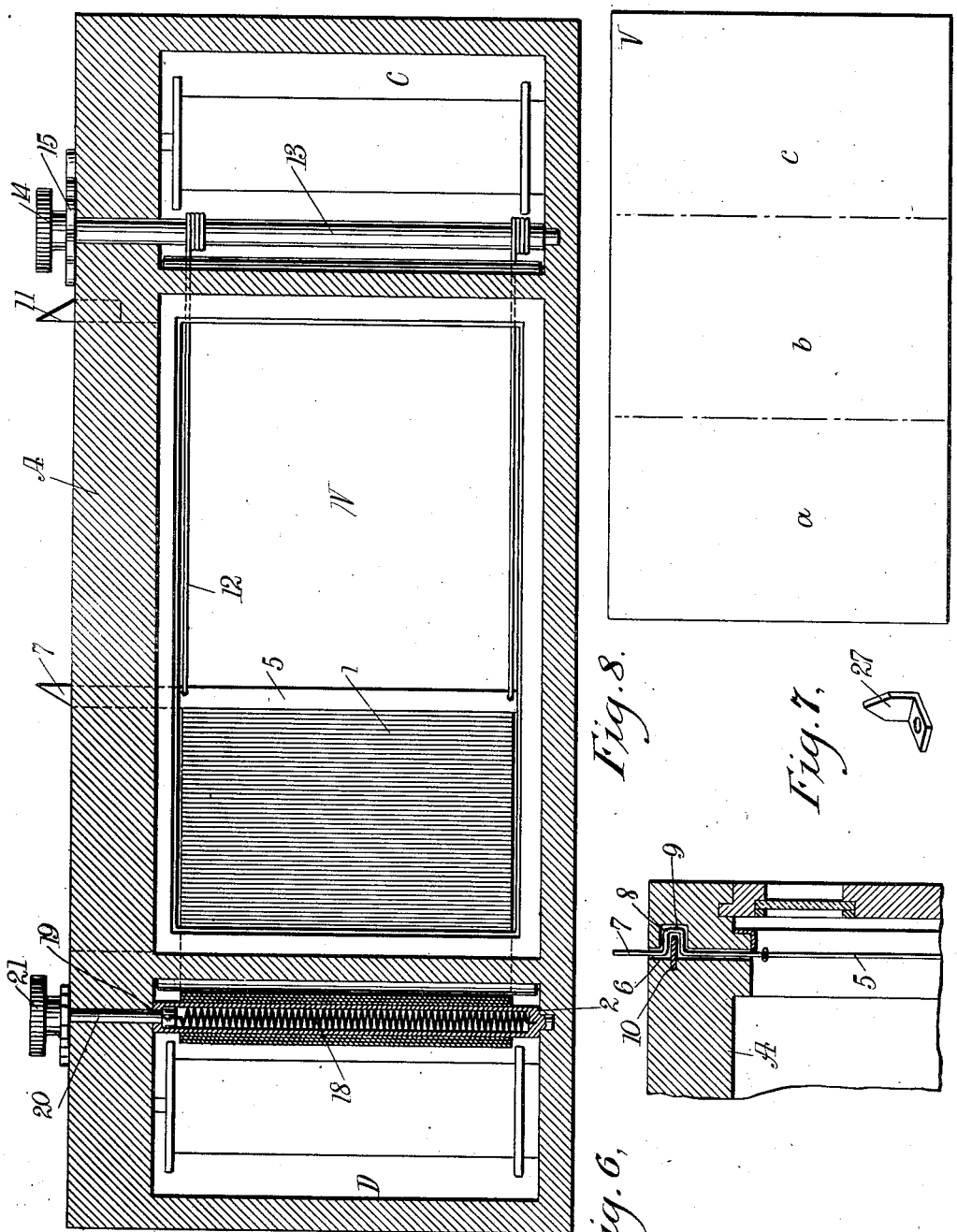

UNITED STATES PATENT OFFICE.

FRANK M. STEADMAN AND HENRY W. HALES, OF RIDGEWOOD, NEW JERSEY.

FILM-CAMERA.

1,032,867.     Specification of Letters Patent.     Patented July 16, 1912.

Application filed August 31, 1911. Serial No. 646,977.

*To all whom it may concern:*

Be it known that we, FRANK M. STEADMAN and HENRY W. HALES, both citizens of the United States, and residents of Ridgewood, in the county of Bergen and State of New Jersey, have invented a new and Improved Film-Camera, of which the following is a full, clear, and exact description.

Our invention relates to a new and improved form of film camera and more particularly relates to the practical construction of the same.

The film camera of the usual type carrying film spools allows of but one size of picture to be taken with any particular camera, that is the size for which it is built or made.

The main object of this invention is to allow not only pictures of different sizes to be taken on the same roll of film at the will of the operator, but to economize on the cost of operation by securing more exposures from the same roll of film, or if the usual number, then of a greater length than originally intended.

It is generally known that the ordinary film roll contains blank unexposed portions of film at each end and in the divisions between the individual pictures which portions are always wasted.

A further object of our invention is to overcome this wastage of sensitized surface space, by providing greater facility for accurately observing and controlling the transfer of the film after exposure.

A further object of our invention is to provide an extended non-actinic viewing window at the back of the camera to enable the operator to easily determine the position of the division numbers printed on the back of the film paper and to follow them over the entire width of the camera back, thus enabling the operator to stop the number at any desired point with certainty and precision whether a large or a small portion of film be used.

Owing to the small size of the non-actinic viewing windows now in use, the number on the film backing is frequently run by the window causing an overlapping of the pictures and a curtailment of their areas. Our invention imposes no restriction on the operator as to the regularity of the exposure numbers on the film backing but allows the making of small, medium or large size pictures promiscuously at will.

A further object of our invention is to provide means whereby a fractional part of the exposure space of each part of each film may be utilized with the optical axis centrally disposed with reference to the space.

We attain the above determined objects by positioning an adjustable shutter or screen in front of the film to vary the amount of film exposed. Further, we provide means for adjusting the position of the lens with reference to the exposed portion of the film.

Reference is to be had to the accompanying drawings forming a part of this specification, in which similar characters of reference indicate corresponding parts in all the views, and in which—

Figure 2:
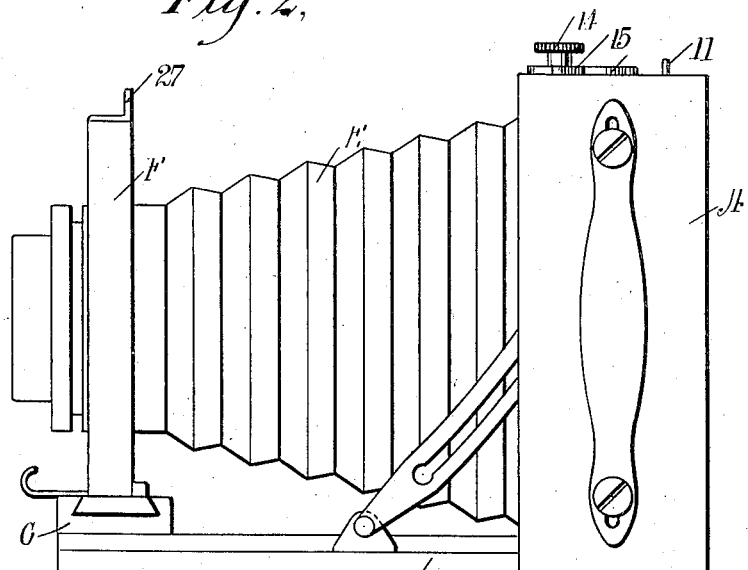

Figure 1 is a plan view looking down upon the upper surface of a film camera, showing a preferred embodiment of our invention forming part thereof; Fig. 2 is a side elevation of the camera shown in Fig. 1; Fig. 3 is an enlarged rear elevation of the upper portion of the camera; Fig. 4 is a transverse sectional view taken on the line 4—4 of Fig. 3 looking in the direction of the arrow; Fig. 5 is a vertical transverse sectional view taken on the line 5—5 of Fig. 4 looking in the direction of the arrow; Fig. 6 is a vertical transverse sectional view taken on the line 6—6 of Fig. 3 and looking in the direction of the arrow; Fig. 7 is a perspective view of the central sight indicator secured to the top of the lens front; and Fig. 8 is an elevation of the exposure portion V of the film, the dotted lines showing how this exposure portion may be sub-divided into three equal parts *a*, *b* and *c*.

Described more in detail, we have shown a form of film camera comprising a casing A, and a folding front and base B, on opposite longitudinal sides of which are the spool cases C and D (Fig. 4), between which spool cases is adapted to be telescoped the bellows E, attached to the camera front or lens carriage F. As is usual with devices of this character it is possible to move the lens vertically in its front F or to move the same from right to left, or vice versa, on the track G. By means of this disposition of the lens with reference to the film hereinafter described it is possible to vary the location of the optic axis.

Mounted in the spool cases C and D (Fig. 4) are spools H and J upon which is wound the usual form of film K passing over guiding rollers L and M disposed on opposite sides of the exposure opening N, between the cases C and D and in rear of the bellows E, in order to actuate the film on to either of the spools H or J. These spools are actuated by the usual form of flat key or other device.

In order to vary the amount of film exposed through the exposure opening N, a curtain 1 is mounted upon a hollow sleeve 2, which sleeve is journaled in the case D and disposed parallel to the spool J. One end of the curtain 1 is affixed to the sleeve, the free end of which passes over a roller 3 through a slot 4 in the inner wall of the casing D and terminates in an edge drawing rod 5, preferably of metal, which drawing rod passes through a slot 6 on top of the casing A, the end of which rod forms an indicating pointer 7 on the outside of the camera casing A (Figs. 5 and 6).

In order to prevent the infiltration of light through the slot 6 (Fig. 6), one edge of said slot is recessed to form a pocket 8 and the drawing rod 5 is bent into a U 9 to fit within said pocket terminating in the pointer 7. The transverse plate 10 is rigidly mounted in the camera case and extends into the U-shaped groove 9, acting as a light cutoff.

The edge of the exposure opening N opposite the side in which the curtain is disposed is marked on the outside of the casing by means of a stationary pointer 11, so that the distance between the pointers 7 and 11 will indicate the width of the exposure opening N, which distance may be indicated on a conventional form of scale 100 disposed on the top of the camera casing and adjacent to one side of the slot 6.

To draw the curtain 1 across the exposure opening N there is attached to the upper and lower portions of the drawing rod 5 in line with the upper and lower edges of the exposure opening N, one end of a cord 12, the opposite end of which is wound about a spindle 13 journaled in the case C and disposed parallel to the spool H. The upper end of the spindle 13 passes through the upper surface of the camera casing A and terminates in a milled head 14 by means of which the spindle 13 is rotated to wrap thereon the cord 12, to draw said curtain across the opening.

The spindle 13 is maintained in its adjusted position by means of a ratchet and pinion connection disposed on top of the camera casing. This connection consists of a ratchet 15 rigidly mounted on the spindle 13, which ratchet is engaged by a pawl 16 maintained in spring-pressed engagement with the ratchet 15 by means of a spring 17 (see Figs. 1 and 5).

To maintain the curtain under tension, there is disposed within the sleeve 2 a coil spring 18, the lower end of which is affixed to the sleeve, the upper of said spring being affixed to a head 19 on the lower end of a pin 20. The upper end of the pin 20 terminates in a milled head 21 by means of which the pin may be rotated to vary the tension on the spring 18 (Fig. 5). The pin 20 is maintained in position by means of a pawl-and-ratchet connection disposed on top of the camera casing A. This pawl-and-ratchet connection consists of a one-way ratchet 22, engaging which is a pawl 23 maintained in engagement with the ratchet by means of the spring 24. By this construction, should the spring lose its resiliency, it may be tightened up to maintain any desired tension upon the shutter 1 (Fig. 1).

In order to trace the course of the exposure portions of the film across the exposure opening, the back of the camera has therein an elongated opening or window 25 extending the full length of the exposure opening N and a slight distance beyond in both directions. By this means the numbers or other characters designating the exposure areas on the backing of the film, may be exactly located with reference to the exposure opening. This opening or window 25 is preferably covered by ruby glass 26 or other non-actinic material. By this construction it is possible to move the curtain to and fro by the thumb and a finger of one hand, the tension sleeve (Fig. 5) taking up the slack at all times.

To facilitate the measuring of the exposure portions of the film, a scale 28 is marked off on the back of the camera or adjacent the opening 25. In order to locate the optical axis a sight 27 is disposed on top of the lens front F so that when the curtain is in tightened position, as, for instance, with the space from 2 to 4 ½ exposed, as shown in Fig. 1, the pointers 7 and 11 may be used as rear sights and the sight 27 as a front sight, as shown in dot-and-dash lines in Fig. 1, to mark out the objective field which would be taken on the exposed portion of the film.

Having thus described our invention, we claim as new and desire to secure by Letters Patent:

1. In a film camera having an exposure opening, means adapted to vary the extent of said opening, said camera having a slot in alinement with said means and having a pocket opening into said slot, a member projecting into said pocket from the opposite side of said slot from said pocket to form a light-tight opening, and a rod carried by said means extending through said opening.

2. A camera having a slot in the top thereof extending parallel to the plane of the exposure opening, said top having a scale adjacent said slot, a shutter within the camera movable parallel to said slot, to vary the effective extent of said exposure opening, and a rigid drawing rod forming the forward edge of said shutter and extending through said slot, affording means to indicate on said scale the effective extent of said opening.

3. A camera having a slot in the top thereof extending parallel to the plane of the exposure opening, said top having a scale adjacent said slot, a shutter within the camera movable parallel to said slot, to vary the effective extent of said exposure opening, a rigid drawing rod forming the forward edge of said shutter and extending through said slot, affording means to indicate on said scale the effective extent of said opening, and means within said slot preventing the infiltration of light therethrough.

4. A camera having an exposure opening, a stationary rear sight carried above the camera and in line with one side of said opening, an opaque shutter movable from the side of the camera opposite said stationary sight, to vary the effective extent of the exposure opening, and a rigid rod forming the forward edge of said shutter, projecting from said camera, to form a movable rear sight, the distance between said sights indicating the effective extent of the exposure opening.

5. A camera having an exposure opening and a lens carriage, a stationary rear sight above the camera and in line with one side of said opening, an opaque shutter movable from the side of the camera opposite said stationary sight, to vary the effective extent of the exposure opening, a rigid rod forming the forward edge of said shutter, projecting from said camera, to form a movable rear sight, and a front sight carried by the lens carriage above the optical axis, said front and rear sights affording means for marking out the objective field.

In testimony whereof we have signed our names to this specification in the presence of two subscribing witnesses.

FRANK M. STEADMAN.
HENRY W. HALES.

Witnesses:
ALFRED H. DAVIS,
PHILIP D. ROLLHAUS.